(12) United States Patent
Ranjbar et al.

(10) Patent No.: US 11,656,314 B2
(45) Date of Patent: May 23, 2023

(54) AOA/AOD CALCULATION WITH MIRROR DISAMBIGUATION

(71) Applicant: SHENZHEN GOODIX TECHNOLOGY CO., LTD., Shenzhen (CN)

(72) Inventors: Mohammad Ranjbar, San Diego, CA (US); Amir Dezfooliyan, San Diego, CA (US); Waleed Younis, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 214 days.

(21) Appl. No.: 17/035,557

(22) Filed: Sep. 28, 2020

(65) Prior Publication Data
US 2022/0099784 A1    Mar. 31, 2022

(51) Int. Cl.
*G01S 3/38* (2006.01)
*G01S 3/46* (2006.01)
*H01Q 21/29* (2006.01)

(52) U.S. Cl.
CPC ............... *G01S 3/38* (2013.01); *G01S 3/465* (2013.01); *H01Q 21/29* (2013.01)

(58) Field of Classification Search
None
See application file for complete search history.

(56) References Cited

U.S. PATENT DOCUMENTS

| 6,239,747 | B1 | 5/2001 | Kaminski |
| 11,125,848 | B2 | 9/2021 | Knaappila |
| 11,342,981 | B2 | 5/2022 | Lim et al. |
| 2008/0158054 | A1 | 7/2008 | Yong et al. |
| 2017/0029107 | A1* | 2/2017 | Emami ............... G08G 5/0069 |
| 2018/0076875 | A1 | 3/2018 | Haverinen et al. |
| 2018/0167150 | A1* | 6/2018 | Clancy ................. H04L 43/16 |

(Continued)

OTHER PUBLICATIONS

Zhenjia Chen et al.: "Monostatic multi-source direction finding based on I/Q radio frequency data", AEU-International Journal of Electronics and Communications, Elsevier, Amsterdam, NL, vol. 97, Oct. 10, 2018, total 12 pages.

(Continued)

*Primary Examiner* — Whitney Moore
(74) *Attorney, Agent, or Firm* — Kilpatrick Townsend & Stockton LLP

(57) ABSTRACT

A receiver circuit is disclosed. The receiver circuit includes a receiver antenna or a receiver antenna arrays oriented at a receiver orientation angle and configured to receive a plurality of RF signals transmitted from a transmitter circuit including a transmit antenna or a transmit antenna array oriented at a transmitter orientation angle. A controller A) calculates first and second AoAs based on a first signal at a first receiver antenna array, and calculates third and fourth AoAs based on a second signal at a second receiver antenna array, and/or B) calculates first and second AoDs based on a third signal from a first transmit antenna array, and calculates third and fourth AoDs based on a fourth signal from a second transmit antenna array. The controller also determines which of the first and second AoAs is correct, and/or determines which of the first and second AoDs is correct.

20 Claims, 5 Drawing Sheets

(56) References Cited

U.S. PATENT DOCUMENTS

2018/0348357 A1* 12/2018 Pandey ............... G01S 13/4454
2020/0068523 A1   2/2020 Pan et al.
2020/0178054 A1   6/2020 Simileysky
2020/0245101 A1*  7/2020 Schober ................ H04W 4/029
2021/0126695 A1*  4/2021 Xin ...................... H04B 17/318

OTHER PUBLICATIONS

United States Patent and Trademark office, Office Action issued in related U.S. Appl. No. 17/035,573, dated Mar. 30, 2023, 21 pages.

* cited by examiner

AOA/AOD CALCULATION WITH MIRROR DISAMBIGUATION

CROSS-REFERENCE TO RELATED APPLICATIONS

This application is related to U.S. patent application Ser. No. 17/035,573, entitled "AoA/AoD CALCULATION WITH LOW ANGLE OF INCIDENCE," filed Sep. 28, 2020, and which is incorporated herein by reference for all purposes.

TECHNICAL FIELD

The subject matter described herein relates to determining Angle of Arrival (AoA) or Angle of Departure (AoD), and more particularly to determining AoA or AoD with mirror disambiguation.

BACKGROUND

RF signals may be transmitted from a transmitter with an Angle of Departure (AoD) and/or received at a receiver circuit based with an Angle of Arrival (AoA), where the AoA/AoD may be any angle. Because AoA/AoD calculations are made using a arccos function, the calculations provide two angle results that are symmetric or mirrored about 0 or π Techniques for accurately calculating AoA or AoD without mirror ambiguity is needed in the art.

SUMMARY

One inventive aspect is a receiver circuit. The receiver circuit includes one or more receiver antennas or one or more receiver antenna arrays oriented at a receiver orientation angle and configured to receive a plurality of RF signals transmitted from a transmitter circuit including one or more transmit antennas or one or more transmit antenna arrays oriented at a transmitter orientation angle. The receiver circuit also includes a controller configured to at least one of A) calculate first and second angles of arrival (AoAs) based on one or more digitized samples of a first RF signal received at a first receiver antenna array, and calculate third and fourth AoAs based on one or more digitized samples of a second RF signal received at a second receiver antenna array, and B) calculate first and second angles of departure (AoDs) based on one or more digitized samples of a third RF signal received from a first transmit antenna array, and calculate third and fourth AoDs based on one or more digitized samples of a fourth RF signal received from a second transmit antenna array. The controller is further configured to at least one of determine which of the first and second AoAs is correct, and determine which of the first and second AoDs is correct.

In some embodiments, the controller is further configured to at least one of determine which of the first and second AoAs is correct based on the third and fourth AoAs, and determine which of the first and second AoDs is correct based on the third and fourth AoDs.

In some embodiments, the controller is further configured to at least one of determine which of the first and second AoAs is correct based further on the receiver orientation angle, and determine which of the first and second AoDs is correct based further on the transmitter orientation angle.

In some embodiments, the controller is further configured to at least one of subtract the receiver orientation angle from each of the third and fourth AoAs to generate fifth and sixth AoA angles, and subtract the transmitter orientation angle from each of the third and fourth AoDs to generate fifth and sixth AoD angles, where the controller is further configured to at least one of identify which of the fifth and sixth AoA angles matches one of the first and second AoAs to determine the correct AoA, and identify which of the fifth and sixth AoD angles matches one of the first and second AoDs to determine the correct AoD.

In some embodiments, at least one of: A) which of the fifth and sixth AoA angles matches one of the first and second AoAs is determined based on which of the fifth and sixth AoA angles is equal to one of the first and second AoAs, and B) which of the fifth and sixth AoD angles matches one of the first and second AoDs is determined based on which of the fifth and sixth AoD angles is equal to one of the first and second AoDs.

In some embodiments, at least one of: A) which of the fifth and sixth AoA angles matches one of the first and second AoAs is determined based on which of the fifth and sixth AoA angles is less than a threshold angle different from one of the first and second AoAs, and B) which of the fifth and sixth AoD angles matches one of the first and second AoDs is determined based on which of the fifth and sixth AoD angles is less than a threshold angle different from one of the first and second AoDs.

In some embodiments, at least one of: A) which of the fifth and sixth AoA angles matches one of the first and second AoAs is determined based on which of the fifth and sixth AoA angles is closer to one of the first and second AoAs than the other of the first and second AoAs and is closer to the one of the first and second AoAs than the other of the fifth and sixth AoA angles is to either of the first and second AoAs, and B) which of the fifth and sixth AoD angles matches one of the first and second AoDs is determined based on which of the fifth and sixth AoD angles is closer to one of the first and second AoDs than the other of the first and second AoDs and is closer to the one of the first and second AoDs than the other of the fifth and sixth AoD angles is to either of the first and second AoDs.

In some embodiments, at least one of the receiver orientation angle is equal to 90°, and the transmitter orientation angle is equal to 90°.

In some embodiments, at least one of the first RF signal is the same RF signal as the second RF signal, and the third RF signal is the same RF signal as the fourth RF signal.

In some embodiments, at least one of the first RF signal is not the same RF signal as the second RF signal, and the third RF signal is not the same RF signal as the fourth RF signal.

Another inventive aspect is a method of using a receiver circuit. The method includes, with one or more receiver antennas or one or more receiver antenna arrays oriented at a receiver orientation angle, receiving a plurality of RF signals transmitted from a transmitter circuit including one or more transmit antennas or one or more transmit antenna arrays oriented at a transmitter orientation angle and, with a controller of the receiver circuit, at least one of A) calculating first and second angles of arrival (AoAs) based on one or more digitized samples of a first RF signal received at a first receiver antenna array, and calculating third and fourth AoAs based on one or more digitized samples of a second RF signal received at a second receiver antenna array, and B) calculating first and second angles of departure (AoDs) based on one or more digitized samples of a third RF signal received from a first transmit antenna array, and calculating third and fourth AoDs based on one or more digitized samples of a fourth RF signal received from a second transmit antenna array. The method also includes, with the controller, at least one of with the controller, determining which of the first and second AoAs is correct, and with the controller, determining which of the first and second AoDs is correct.

In some embodiments, the method further includes at least one of: A) with the controller, determining which of the first and second AoAs is correct based on the third and fourth AoAs, and determining which of the first and second AoDs is correct based on the third and fourth AoDs.

In some embodiments, the method further includes, with the controller, at least one of: A) determining which of the first and second AoAs is correct based further on the receiver orientation angle, and B) determining which of the first and second AoDs is correct based further on the transmitter orientation angle.

In some embodiments, the method further includes at least one of: A) with the controller, subtracting the receiver orientation angle from each of the third and fourth AoAs to generate fifth and sixth AoA angles, and B) with the controller, subtracting the transmitter orientation angle from each of the third and fourth AoDs to generate fifth and sixth AoD angles, and the method further includes at least one of: A) with the controller, identifying which of the fifth and sixth AoA angles matches one of the first and second AoAs to determine the correct AoA, and B) with the controller, identifying which of the fifth and sixth AoD angles matches one of the first and second AoDs to determine the correct AoD.

In some embodiments, at least one of: A) which of the fifth and sixth AoA angles matches one of the first and second AoAs is determined based on which of the fifth and sixth AoA angles is equal to one of the first and second AoAs, and B) which of the fifth and sixth AoD angles matches one of the first and second AoDs is determined based on which of the fifth and sixth AoD angles is equal to one of the first and second AoDs.

In some embodiments, at least one of: A) which of the fifth and sixth AoA angles matches one of the first and second AoAs is determined based on which of the fifth and sixth AoA angles is less than a threshold angle different from one of the first and second AoAs, and B) which of the fifth and sixth AoD angles matches one of the first and second AoDs is determined based on which of the fifth and sixth AoD angles is less than a threshold angle different from one of the first and second AoDs.

In some embodiments, at least one of: A) which of the fifth and sixth AoA angles matches one of the first and second AoAs is determined based on which of the fifth and sixth AoA angles is closer to one of the first and second AoAs than the other of the first and second AoAs and is closer to the one of the first and second AoAs than the other of the fifth and sixth AoA angles is to either of the first and second AoAs, and B) which of the fifth and sixth AoD angles matches one of the first and second AoDs is determined based on which of the fifth and sixth AoD angles is closer to one of the first and second AoDs than the other of the first and second AoDs and is closer to the one of the first and second AoDs than the other of the fifth and sixth AoD angles is to either of the first and second AoDs.

In some embodiments, at least one of the receiver orientation angle is equal to 90°, and the transmitter orientation angle is equal to 90°.

In some embodiments, at least one of the first RF signal is the same RF signal as the second RF signal, and the third RF signal is the same RF signal as the fourth RF signal.

In some embodiments, at least one of the first RF signal is not the same RF signal as the second RF signal, and the third RF signal is not the same RF signal as the fourth RF signal.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers may denote similar structures, features, or elements.

DETAILED DESCRIPTION

Particular embodiments of the invention are illustrated herein in conjunction with the drawings. Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1A:
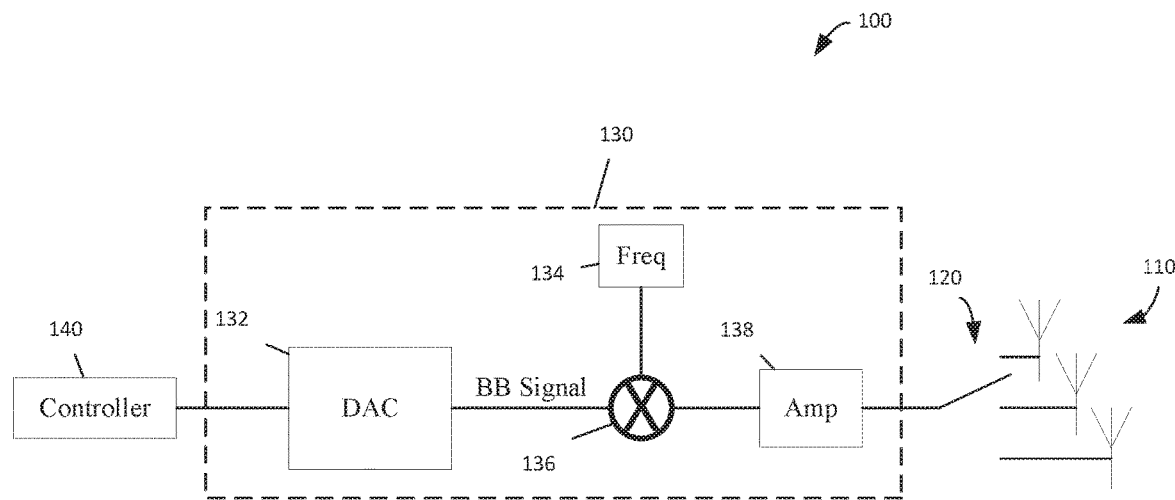
FIG. 1A is a schematic diagram of an embodiment of a transmitter circuit according to an embodiment.
Figure 1B:
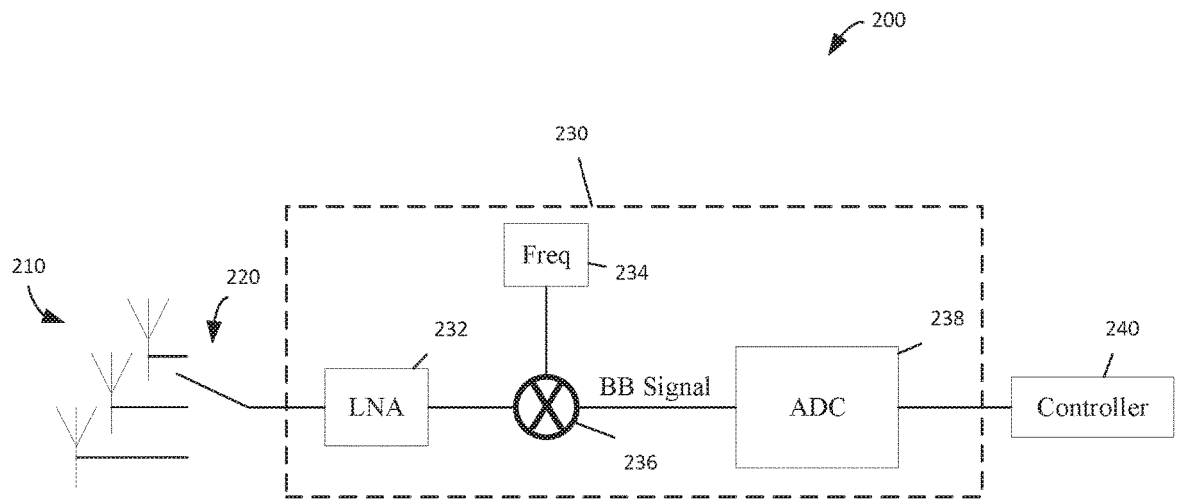
FIG. 1B is a schematic diagram of an embodiment of a receiver circuit according to an embodiment.
Figure 2A:
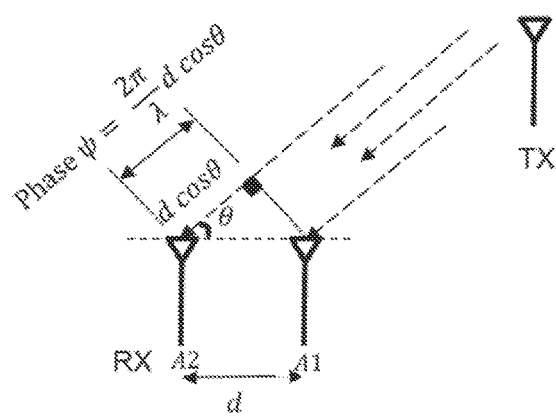
FIG. 2A is a schematic diagram of a two antenna system illustrating AoA.
Figure 2B:
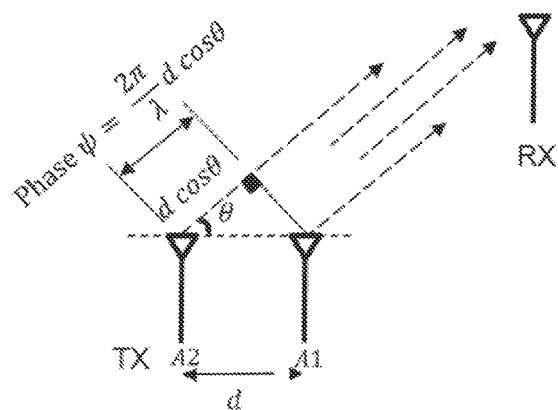
FIG. 2B is a schematic diagram of two antenna systems illustrating AoD.
Figure 3:
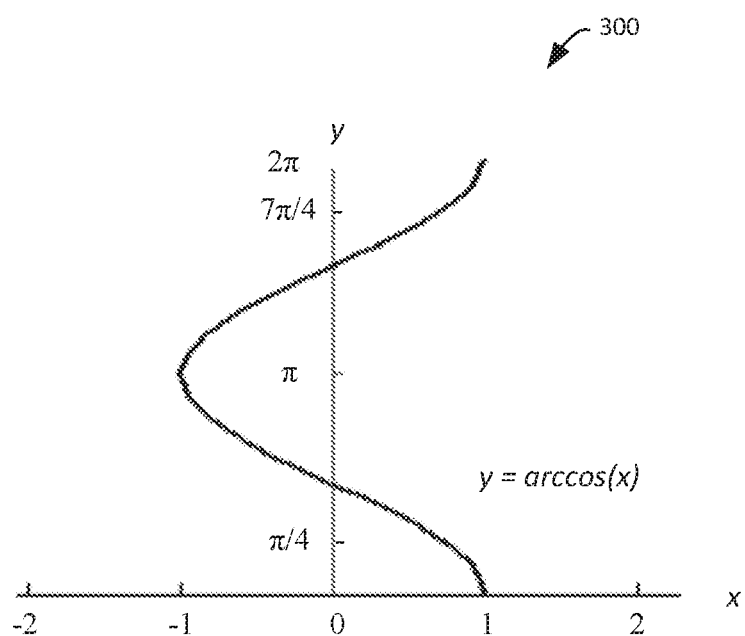
FIG. 3 illustrates a graph of a y=arccos(x) function.
Figure 4:
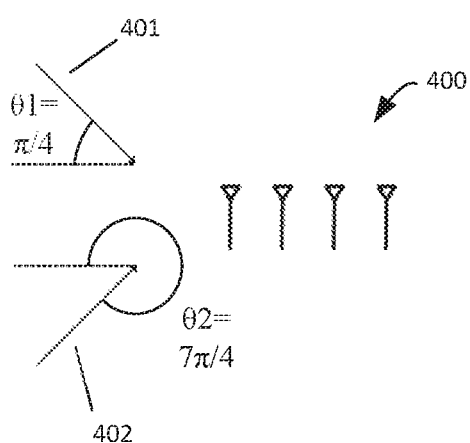
FIG. 4 is a schematic diagram of an antenna array system.
Figure 5:
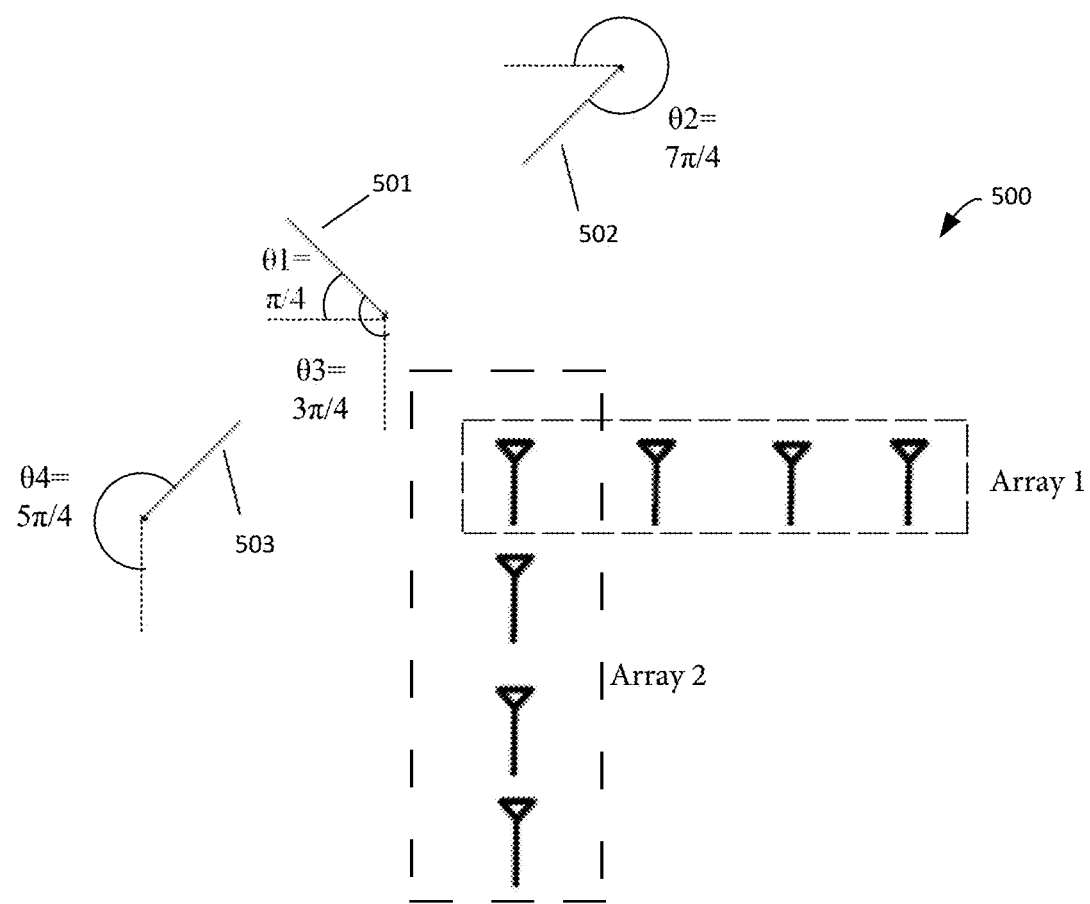
FIG. 5 is a graphic illustration of a two antenna array system which may be used to calculate AoA for a received RF signal.
Figure 6:
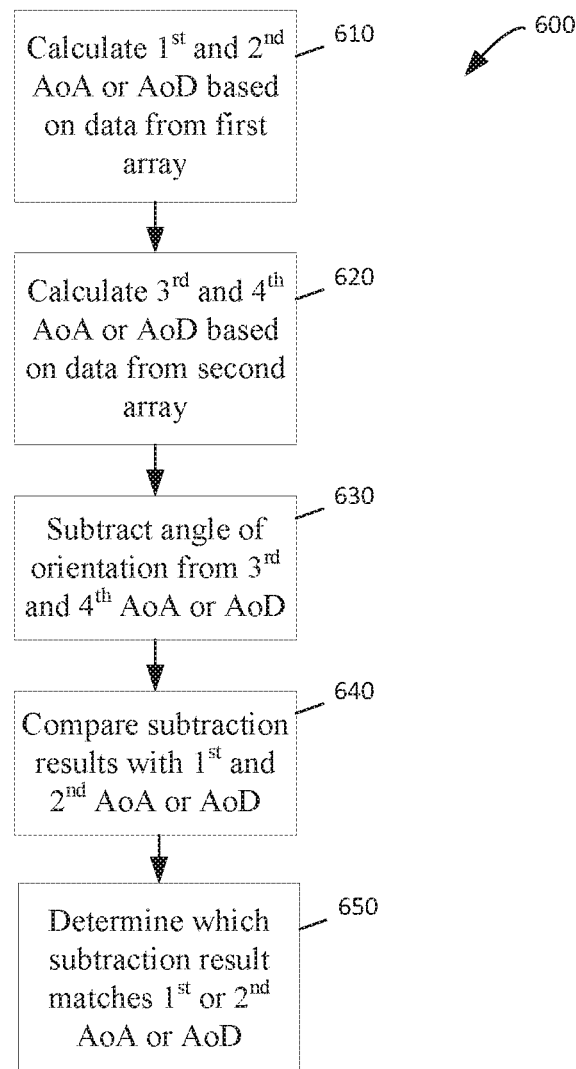
FIG. 6 is a flowchart illustrating a method of calculating AoA or AoD.

Embodiments illustrate circuits and methods for determining a measured angle of departure (AoD) of an RF signal transmitted by a transmitter circuit with an antenna system having at least two antenna arrays or for determining a measured angle of arrival (AoA) of an RF signal received at a receiver circuit having an antenna system having at least two antenna arrays. The AoA or AoD is determined at a receiver circuit based on a number of digitized samples of the RF signal. Because AoA or AoD calculation accuracy is sensitive to the AoA or AoD, the AoA or AoD is calculated based on digitized samples of the RF signal either transmitted by the antenna array of the transmitter circuit more perpendicular to the receiver circuit or is calculated based on digitized samples of the RF signal received by the antenna array of the receiver circuit more perpendicular to the transmitter circuit. FIGS. 1A and 1B respectively illustrate schematic diagrams of a receiver circuit and a transmitter circuit. FIGS. 2A and 2B respectively illustrate AoA and AoD. FIGS. 3 and 4 illustrate AoA or AoD measurement sensitivity to AoA or AoD. FIGS. 5 and 6 illustrate a two array antenna system and a method of calculating AoA or AoD.

FIG. 1A is a schematic diagram of an embodiment of a transmitter circuit 100 according to an embodiment. Transmitter circuit 100 includes antenna or antenna array 110, switch 120, RF chain 130, and controller 140. Transmitter circuit 100 illustrates a particular example. Other embodiments of transmitter circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays, or, for example, having a single row of antennas forming a first antenna array and a single column of antennas forming a second antenna array.

In embodiments where antenna or antenna array 110 includes one antenna, the one antenna may be connected directly to RF chain 130, and switch 120 may be omitted. In embodiments where antenna or antenna array 110 includes multiple antennas, each antenna may be directly connected to a separate RF chain. Each of the RF chains may have the features of RF chain 130. Alternatively, in some embodiments where antenna or antenna array 110 includes multiple antennas, as illustrated, each of the antennas may be selectively connected one at a time to a single RF chain.

Antenna or antenna array 110 may be configured to transmit RF signals to a receiver circuit, such as receiver circuit 200 described below with reference to FIG. 1B. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140. The RF signals transmitted by antenna or antenna array 110 are transmitted from transmitter 100 with an AoD, as understood by those of skill in the art.

Controller 140 is configured to provide a digital signal to RF chain 130, where the digital signal encodes the information signal to be transmitted by antenna or antenna array 110.

RF chain 130 includes digital to analog converter (DAC) 132, mixer 136, frequency synthesizer 134, and power amplifier (PA) 138. RF chain 130 is an example only, and embodiments of other RF chains may alternatively be used. For example, in some embodiments, one or more amplifiers, and/or filters may be included, as understood by those of skill in the art.

The digital signal is processed by the digital to analog converter 132 to generate an analog baseband signal representing the digital signal, using techniques known in the art. Various digital to analog converter structures known in the art may be used.

Mixer 136 receives the analog baseband signal output from the digital to analog converter 132 and an oscillator signal at a carrier frequency generated by frequency synthesizer 134. In response to the analog baseband signal and the oscillator signal, mixer 136 up converts the analog baseband signal from the analog-to-digital converter 132 to a high frequency signal, using techniques known in the art. Various mixer structures known in the art may be used. The resulting high frequency signal is at the carrier frequency and is modulated so as to include the information of the low frequency information signal.

Power amplifier 138 is configured to receive the high frequency signal, and the high frequency signal is driven to one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 1A, control signals from controller 140 may control certain variable functionality of switch 120, power amplifier 138, frequency synthesizer 134, mixer 136, and digital to analog converter 132, for example, as understood by those of skill in the art.

The control signals from controller 140 may, for example, control switch 120 to control which of multiple antennas RF chain 130 drives the high frequency signal with.

In embodiments having multiple antennas each connected to one of multiple RF chains, controller 140 may generate control signals for each of the RF chains.

FIG. 1B is a schematic diagram of an embodiment of a receiver circuit 200 according to an embodiment. Receiver circuit 200 includes antenna or antenna array 210, switch 220, RF chain 230, and controller 240. Receiver circuit 200 illustrates a particular example. Other embodiments of receiver circuits may be used.

Antenna or antenna array 210 may be any antenna or antenna array. For example, in some embodiments, antenna or antenna array 210 includes 1, 2, 3, 4, or more antennas. In some embodiments, antenna or antenna array 210 includes a linear antenna array. In some embodiments, antenna or antenna array 210 includes a two dimensional antenna array, for example, having multiple rows of linear antenna arrays, or, for example, having a single row of antennas forming a first antenna array and a single column of antennas forming a second antenna array.

In embodiments where antenna or antenna array 210 includes one antenna, the one antenna may be connected directly to RF chain 230, and switch 220 may be omitted. In embodiments where antenna or antenna array 210 includes multiple antennas, each antenna may be directly connected to a separate RF chain. Each of the RF chains may have the features of RF chain 230. Alternatively, in some embodiments where antenna or antenna array 210 includes multiple antennas, as illustrated, each of the antennas may be selectively connected one at a time to a single RF chain.

Antenna or antenna array 210 may be configured to receive RF signals generated by a transmitter, such as transmitter 100 described above with reference to FIG. 1A. The RF signals received by antenna or antenna array 210 are received from a transmitter, such as transmitter 100 with an AoA, as understood by those of skill in the art.

RF chain 230 includes low noise amplifier (LNA) 232, frequency synthesizer 234, mixer 236, and analog to digital converter (ADC) 238. RF chain 230 is an example only, and embodiments of other RF chains may alternatively be used. For example, in some embodiments, one or more amplifiers, and/or filters may be included, as understood by those of skill in the art.

Low noise amplifier 232 is configured to receive a high frequency signal at a carrier frequency and modulated with a low frequency information signal. The high frequency signal is received from one of the antennas from antenna or antenna array 210, for example, according to a programmable electrical connection formed by switch 220, as controlled by controller 240. The high frequency signal is amplified by low noise amplifier 232 to generate an amplified RF signal, using techniques known in the art. Various low noise amplifier structures known in the art may be used.

Mixer 236 receives the amplified RF signal output from the low noise amplifier 232 and an oscillator signal at or substantially at the carrier frequency generated by frequency synthesizer 234. In response to the amplified RF signal and the oscillator signal, mixer 236 down converts the amplified RF signal from the low noise amplifier 232 to a baseband signal, using techniques known in the art. Various mixer structures known in the art may be used. The resulting baseband signal includes information of the low frequency information signal.

The baseband signal is then processed by the analog-to-digital converter 238 to generate a digital signal representing the baseband signal, using techniques known in the art. Various analog-to-digital converter structures known in the art may be used.

Controller 240 receives the digital representation of the baseband signal.

As understood by those of skill in the art, using communication connectivity not illustrated in FIG. 1B, control signals from controller 240 may control certain variable functionality of switch 220, low noise amplifier 232, frequency synthesizer 234, mixer 236, and analog-to-digital converter 238, for example, as understood by those of skill in the art.

The control signals from controller 240 may, for example, control switch 220 to select which of multiple antennas RF chain 230 receives the high frequency signals from.

For example, controller 240 may generate control signals which result in controller 240 receiving a group of digital signals, where each digital signal of the group is generated by RF chain 230 based on a high frequency signal received by a selected one of the antennas. In embodiments having multiple antennas each connected to one of multiple RF chains, controller 240 may generate control signals for each of the RF chains, such that controller 240 receives a group of digital signals, where each digital signal of the group is generated by one of the RF chains based on an RF signal received by the particular antenna connected thereto. Using techniques described below, controller 240 is configured to store the group of digital signals in a memory, and to determine an AoA or AoD for the received RF signals based on the group of digital signals it receives.

FIG. 2A is a schematic diagram illustrating the geometry of phase-based estimation of angle of arrival (AoA) of an RF signal received at an antenna array comprising antenna A1 and antenna A2.

As shown, the transmitted RF signal is received at an angle of arrival (AoA) θ at antennas A1 and A2. According to geometric and trigonometric principles understood by those of skill in the art, $$AoA = \theta = \arccos\left(\frac{\lambda \psi}{2\pi d}\right),$$

where
λ=wavelength of the RF signal,
ψ=the phase difference between the signals arrival at antennas A1 and A2, and
d=distance between antennas A1 and A2.

Using techniques known to those of skill in the art, a controller, such as controller 240 of receiver circuit 200 of FIG. 1B, may calculate AoA.

For example, an embodiment of receiver circuit 200 having one RF chain for each of antennas A1 and A2, assuming no carrier frequency offset, may calculate AoA as follows:

For transmitted signal $e^{-i2\pi f_h t_1} e^{-i2\pi f_l t_1}$,
where:
$f_h$=the carrier frequency,
$t_1$=the time of the transmitter oscillator
$f_l$=the baseband frequency,
the signal sample received at antenna A1 is $e^{-i2\pi f_h t_1} e^{-i2\pi f_l t_1} e^{i\varphi_1}$,
where:
$\varphi_1$=the signal phase of the received sample; and
the signal sample received at antenna A2 is $e^{-i2\pi f_h t_1} e^{-i2\pi f_l t_1} e^{i\varphi_2}$,
where:
$\varphi_2$=the signal phase of the received sample.

The downconverted sample received at antenna A1 is:

$$e^{i2\pi f_h t_2} e^{-i2\pi f_h t_1} e^{-i2\pi f_l t_1} e^{i\varphi_1} = e^{-i2\pi f_h(t_1-t_2)} e^{-i2\pi f_l t_1} e^{i\varphi_1},$$

where:
$t_2$=the time of the receiver oscillator.

The downconverted sample received at antenna A2 is:

$$e^{i2\pi f_h t_2} e^{-i2\pi f_h t_1} e^{-i2\pi f_l t_1} e^{i\varphi_2} = e^{-i2\pi f_h(t_1-t_2)} e^{-i2\pi f_l t_1} e^{i\varphi_2},$$

The phase difference is:

$$(-2\pi f_h(t_1 - t_2) - 2\pi f_l t_1 + \varphi_2) - (-2\pi f_h(t_1 - t_2) - 2\pi f_l t_1 + \varphi_1) = \varphi_2 - \varphi_1.$$

$$AoA = \theta = \arccos\left(\frac{\lambda(\varphi_2 - \varphi_1)}{2\pi d}\right),$$

as discussed above.

Alternatively, an embodiment of receiver circuit 200 having one RF chain for both antennas A1 and A2, assuming no carrier frequency offset, may calculate AoA as follows:

For transmitted signal $e^{-i2\pi f_h t_1} e^{-i2\pi f_l t_1}$,
where:
$f_h$=the carrier frequency,
$t_i$=the time of the transmitter oscillator
$f_l$=the baseband frequency,
the signal received at antenna A1 is $e^{-i2\pi f_h t_1} e^{-i2\pi f_l t_1} e^{i\varphi_1}$,
where:
$\varphi_1$=the signal phase of the received sample; and
the signal received at antenna A2 is $e^{-i2\pi f_h(t_1+T)} e^{-i2\pi f_l(t_1+T)} e^{i\varphi_2}$,
where:
$\varphi_2$=the signal phase of the received sample, and
T=the sampling period.

The downconverted sample received at antenna A1 is:

$$e^{i2\pi f_h t_2} e^{-i2\pi f_h t_1} e^{-i2\pi f_l t_1} e^{i\varphi_1} = e^{-i2\pi f_h(t_1-t_2)} e^{-i2\pi f_l t_1} e^{i\varphi_1},$$

where:
$t_2$=the time of the receiver oscillator.

The downconverted sample received at antenna A2 is:

$$e^{i2\pi f_h(t_2+T)} e^{-i2\pi f_h(t_1+T)} e^{-i2\pi f_l(t_1+T)} e^{i\varphi_2} = e^{-i2\pi f_h(t_1-t_2)} e^{-i2\pi f_l(t_1+T)} e^{i\varphi_2},$$

The phase difference is:

$$(-2\pi f_h(t_1-t_2)-2\pi f_l(t_1+T)+\varphi_2)-(-2\pi f_h(t_1-t_2)-2\pi f_l t_1+\varphi_1)=-2\pi f_l T+\varphi_2-\varphi_1.$$

Therefore, $\varphi_2-\varphi_1=(-2\pi f_h(t_1-t_2)-2\pi f_l(t_1+T)+\varphi_2)-(-2\pi f_h(t_1-t_2)-2\pi f_l t_1+\varphi_1)+2\pi f_l T$.

Accordingly, the phase difference for calculating AoA ($\varphi_2-\varphi_1$) is equal to the phase difference measured+$2\pi f_l T$.

$$AoA = \theta = \arccos\left(\frac{\lambda(\varphi_2 - \varphi_1)}{2\pi d}\right),$$

as discussed above.

FIG. 2B is a schematic diagram illustrating the geometry of phase-based estimation of angle of departure (AoD) of an RF signal transmitted by an antenna array comprising antenna A1 and antenna A2.

As shown, the RF signal is transmitted at an angle of departure (AoD) θ from antennas A1 and A2. According to geometric and trigonometric principles understood by those of skill in the art, $$AoD = \theta = \arccos\left(\frac{\lambda\psi}{2\pi d}\right),$$

where
λ=wavelength of the RF signal transmitted from antennas A1 and A2,
ψ=a phase difference between signals received from antennas A1 and A2, and
d=distance between antennas A1 and A2.

Using techniques known to those of skill in the art, a controller, such as controller 240 of receiver circuit 200 of FIG. 1B, may calculate AoD.

For example, an embodiment of receiver circuit 200 may calculate AoD as follows:

For signals respectively transmitted from antennas A1 and A2:

$$e^{-i2\pi f_h t_1}e^{-i2\pi f_l t_1}, \text{ and } e^{-i2\pi f_h(t_1+T)}e^{-i2\pi f_l(t_1+T)}$$

where:
$f_h$=the carrier frequency,
$t_1$=the time of the transmitter oscillator
$f_l$=the baseband frequency,
the first sample received at antenna RX is $e^{-i2\pi f_h t_1}\ e^{-i2\pi f_l t_1}\ e^{i\varphi_1}$,
where:
$\varphi_i$=the signal phase of the first sample; and
the second sample received at antenna RX is $e^{-i2\pi f_h(t_1+T)}e^{-i2\pi f_l(t_1+T)}e^{i\varphi_2}$,
where:
$\varphi_2$=the signal phase of the second sample, and
T=the sampling period.

The downconverted first sample is:

$$e^{i2\pi f_h t_2}e^{-i2\pi f_h t_1}e^{-i2\pi f_l t_1}e^{i\varphi_1}=e^{-i2\pi f_h(t_1-t_2)}e^{-i2\pi f_l t_1}e^{i\varphi_1},$$

where:
$t_2$=the time of the receiver oscillator.

The downconverted second sample is:

$$e^{i2\pi f_h(t_2+T)}e^{-i2\pi f_h(t_1+T)}e^{-i2\pi f_l(t_1+T)}e^{i\varphi_2}=e^{-i2\pi f_h(t_1-t_2)}e^{-i2\pi f_l(t_1+T)}e^{i\varphi_2},$$

The phase difference is:

$$(-2\pi f_h(t_1-t_2)-2\pi f_l(t_1+T)+\varphi_2)-(-2\pi f_h(t_1-t_2)-2\pi f_l t_1+\varphi_1)=-2\pi f_l T+\varphi_2-\varphi_1.$$

Therefore, $\varphi_2-\varphi_1=(-2\pi f_h(t_1-t_2)-2\pi f_l(t_1+T)+\varphi_2)-(-2\pi f_h(t_1-t_2)-2\pi f_l t_1+\varphi_1)+2\pi f_l T.$ Accordingly, the phase difference for calculating AoD $(\varphi_2-\varphi_1)$ is equal to the phase difference measured+$2\pi f_l T$.

$$AoD = \theta = \arccos\left(\frac{\lambda(\varphi_2 - \varphi_1)}{2\pi d}\right),$$

as discussed above.
As discussed above $$AoA = \theta = \arccos\left(\frac{\lambda\psi}{2\pi d}\right), \text{ and}$$

$$AoD = \theta = \arccos\left(\frac{\lambda\psi}{2\pi d}\right),$$

where
λ=wavelength of the RF signal,
ψ=phase difference of the signals received/transmitted by antennas A1 and A2, and
d=distance between antennas A1 and A2.

Furthermore, as known to those of skill in the art, the AoA or AoD angle calculated with the arccos function returns two angles having a mirror relationship about 0 and π

FIG. 3 illustrates a graph 300 of y=arccos(x), where $$x = \frac{\lambda(\varphi_2 - \varphi_1)}{2\pi d},$$

which is based on a measured value of phase difference of digital samples of the RF signal. Accordingly, graph 300 shows AoA or AoD measurement provides two angles for each x value, where the AoA or AoD measurements are symmetric or mirrored about π. As understood by those of skill in the art, the AoA or AoD measurements are also symmetric or mirrored about 0.

For example, if $$x = \frac{\lambda(\varphi_2 - \varphi_1)}{2\pi d} \text{ equals } 0,$$

the y=arccos(x) function returns both π/2 and 3π/2. Similarly, if $$x = \frac{\lambda(\varphi_2 - \varphi_1)}{2\pi d} \text{ equals } 0.707,$$

the y=arccos(x) function returns both π/4 and 7π/4. In addition, if $$x = \frac{\lambda(\varphi_2 - \varphi_1)}{2\pi d} \text{ equals } -0.707,$$

the y=arccos(x) function returns both 3π/4 and 5π/4.

FIG. 4 is a schematic diagram of an antenna array 400 used for calculating an AoA of RF signal 401, received at an AoA θ1 equal to π/4. In this example, $$x = \frac{\lambda(\varphi_2 - \varphi_1)}{2\pi d}$$

is equal to 0.707. Accordingly, the calculated AoA is equal to both π/4 and 7π/4, represented as phantom RF signal 402.

FIG. 3 illustrates a graph 300 of y=arccos(x), FIG. 4 is a schematic diagram of an antenna array 400 used for calculating an AoA of RF signal 401, FIG. 5 is a graphic illustration of a two antenna array system 500 which may be used to calculate AoA for received RF signal 501. Antenna array system 500 includes first linear antenna array Array 1, and second linear antenna array Array 2. In this embodiment, Array 2 of antenna array system 500 is oriented with respect to Array 1 of antenna array system 500 at or substantially at 90° or $\pi/2$. In alternative embodiments, different antenna array systems may be used.

As illustrated, RF signal 501 is received at Array 1 of antenna array system 500 with a first AoA $\theta 1$ equal to $\pi/4$ and a second AoA $\theta 2$ equal to $7\pi/4$, represented as phantom RF signal 502. In addition, RF signal 501 is received at Array 2 of antenna array system 500 with a third AoA $\theta 3$ equal to $3\pi/4$ and a fourth AoA $\theta 4$ equal to $5\pi/4$, represented as phantom RF signal 503.

In some embodiments, the RF signal 501 received at Array 2 of antenna array system 500 is the same RF signal 501 received at Array 1 of antenna array system 500. In some embodiments, the RF signal 501 received at Array 2 of antenna array system 500 is different from the RF signal 501 received at Array 1 of antenna array system 500. In some embodiments, the RF signal 501 received at Array 2 of antenna array system 500 is a first sample of a particular RF signal, and the RF signal 501 received at Array 1 of antenna array system 500 is a second, different sample of the particular RF signal.

Based on the four AoA measurements $\theta 1$, $\theta 2$, $\theta 3$, and $\theta 4$, the controller may determine which two AoA measurements are correct, and which two AoA measurements are mirrors of the correct AoA measurements. To do this, the controller may subtract the angle of orientation of Array 2 of antenna array system 500 with respect to Array 1 of antenna array system 500 from each of the AoA measurements determined based on the RF signal 501 received at Array 2 of antenna array system 500, and compare each of the results with the AoA measurements determined based on the RF signal 501 received at Array 1 of antenna array system 500.

The AoA measurement determined based on the RF signal 501 received at Array 1 of antenna array system 500 matching the subtraction result is correct, and correctly represents the AoA of the RF signal 500 with respect to Array 1 of antenna array system 500. In addition, the other AoA measurement determined based on the RF signal 501 received at Array 1 of antenna array system 500, not matching the subtraction result, is a mirror of the correct AoA measurement with respect to Array 1 of antenna array system 500.

In some embodiments, an AoA measurement determined based on the RF signal 501 received at Array 1 of antenna array system 500 matches one of the subtraction results if the AoA measurement determined based on the RF signal 501 received at Array 1 of antenna array system 500 is equal or substantially equal to one of the subtraction results. In some embodiments, an AoA measurement determined based on the RF signal 501 received at Array 1 of antenna array system 500 matches one of the subtraction results if the AoA measurement determined based on the RF signal 501 received at Array 1 of antenna array system 500 is less than a threshold angle different from one of the subtraction results. In some embodiments, an AoA measurement determined based on the RF signal 501 received at Array 1 of antenna array system 500 matches one of the subtraction results if the AoA measurement determined based on the RF signal 501 received at Array 1 of antenna array system 500 is closer to one of the subtraction results than the other (or any other) subtraction result, and is closer to the one subtraction result than the other (or any other) AoA measurement determined based on the RF signal 501 received at Array 2 of antenna array system 500 is to the other (or any other) subtraction result.

In addition, the AoA measurement determined based on the RF signal 501 received at Array 2 of antenna array system 500 used in the subtraction result matching the AoA measurement determined based on the RF signal 501 received at Array 1 of antenna array system 500 is correct, and correctly represents the AoA of the RF signal 500 with respect to Array 2 of antenna array system 500. In addition, the other AoA measurement determined based on the RF signal 501 received at Array 2 of antenna array system 500, not used in the subtraction result matching the AoA measurement determined based on the RF signal 501 received at Array 1 of antenna array system 500, is a mirror of the correct AoA measurement with respect to Array 2 of antenna array system 500.

In the illustrated example, in response to the RF signal 501 received at Array 1 of antenna array system 500, AoA measurements of $\theta 1$ equal to $\pi/4$ and $\theta 2$ equal to $7\pi/4$ are calculated by the controller. One of the AoA measurements $\theta 1$ equal to $\pi/4$ and $\theta 2$ equal to $7\pi/4$ is correct and one of the AoA measurements is a mirror of the correct AoA measurement.

In addition, in response to the RF signal 501 received at Array 2 of antenna array system 500, AoA measurements of $\theta 3$ equal to $3\pi/4$ and $\theta 4$ equal to $5\pi/4$ are calculated by the controller. One of the AoA measurements $\theta 3$ equal to $3\pi/4$ and $\theta 4$ equal to $5\pi/4$ is correct and one of the AoA measurements is a mirror of the correct AoA measurement.

In this example, Array 2 of antenna array system 500 is oriented with respect to Array 1 of antenna array system 500 at 90° or $\pi/2$. Accordingly, to identify or determine the correct AoA measurements, the controller may subtract $\pi/2$ from each of the AoA measurements determined based on the RF signal 501 received at Array 2 of antenna array system 500, and compare the result with the AoA measurements determined based on the RF signal 501 received at Array 1 of antenna array system 500. Accordingly, the controller may determine that AoA measurement $\theta 3$, equal to $3\pi/4$, minus $\pi/2$ is equal to $\pi/4$, and that AoA measurement $\theta 4$, equal to $5\pi/4$, minus $\pi/2$ is equal to $3\pi/4$, and may further determine that AoA measurement $\theta 3$ equal to $3\pi/4$ minus $\pi/2$ ($=\pi/4$) matches the AoA measurement $\theta 1$ ($=\pi/4$) calculated based on the RF signal 501 received at Array 1 of antenna array system 500. Accordingly, the controller identifies AoA measurement $\theta 1$ based on RF signal 501 received at Array 1 and AoA measurement $\theta 3$ based on RF signal 501 received at Array 2 as being correct, and identifies AoA measurement $\theta 2$ based on RF signal 501 received at Array 1 and AoA measurement $\theta 4$ based on RF signal 501 received at Array 2 as being incorrect or as respectively being mirrors of correct AoA measurements $\theta 1$ and $\theta 3$.

As understood by those of skill in the art, the principles discussed with reference to FIGS. 3-5 regarding measurements and calculations of AoA, analogously apply to measurements and calculations of AoD.

FIG. 6 is a flowchart illustrating a method 600 of calculating AoA or AoD based on data from first and second antenna arrays of an antenna array system, where the second antenna array is oriented with respect to the first antenna array by an angle of relative orientation. An example of such an antenna array system is illustrated in FIG. 5. Method 600 may be performed, for example by a receiver circuit, such as receiver circuit 200.

At 610, first and second AoA or AoD measurements are calculated with, for example, a controller based on a first RF signal received at or transmitted by one of the first and second antenna arrays of the antenna array system. The calculations may be made using any suitable AoA or AoD calculation method.

At 620, third and fourth AoA or AoD measurements are calculated with, for example, the controller based on a second RF signal received at or transmitted by one of the first and second antenna arrays of the antenna array system. The calculations may be made using any suitable AoA or AoD calculation method. The first and second RF signals may be the same RF signal. In some embodiments, the first and second RF signals are different.

At 630, the angle of relative orientation of the first and second antenna arrays is subtracted from each of the third and fourth AoA or AoD measurements by, for example, the controller to generate fifth and sixth angles.

At 640, each of the fifth and sixth angles is compared with each of the first and second AoA or AoD measurements by, for example, the controller.

At 650, which subtraction result matches one of the first and second AoA or AoD measurements is determined by, for example, the controller to determine a correct AoA or AoD measurement.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A receiver circuit, comprising:
    a first receiver antenna array of two or more receiver antennas oriented at a first receiver orientation angle, a second receiver antenna array of two or more receiver antennas oriented at a second receiver orientation angle offset from the first receiver orientation angle by a non-zero angular difference, each of the first and second receiver antenna arrays being a linear array, and the first and second receiver antenna arrays configured to receive a plurality of RF signals transmitted from a transmitter circuit comprising one or more transmit antennas; and
    a controller configured to:
        calculate first and second angles of arrival (AoAs) based on one or more digitized samples of a first RF signal received at the first receiver antenna array, and calculate third and fourth AoAs based on one or more digitized samples of a second RF signal received at the second receiver antenna array, the first and second AoAs being mirrored over the first receiver orientation angle, the third and fourth AoAs being mirrored over the second receiver orientation angle; and
        determine which of the first and second AoAs is correct based on at least one of the third AoA or the fourth AoAs and on the angular difference.

2. The receiver circuit of claim 1, wherein the controller is further configured to:
    subtract the angular difference from each of the third and fourth AoAs to generate fifth and sixth AoA angles,
    wherein the controller is configured to determine which of the first and second AoAs is correct by identifying which of the fifth and sixth AoA angles matches one of the first and second AoAs.

3. The receiver circuit of claim 2, wherein:
    which of the fifth and sixth AoA angles matches one of the first and second AoAs is determined based on which of the fifth and sixth AoA angles is equal to one of the first and second AoAs.

4. The receiver circuit of claim 2, wherein:
    which of the fifth and sixth AoA angles matches one of the first and second AoAs is determined based on which of the fifth and sixth AoA angles is less than a threshold angle different from one of the first and second AoAs.

5. The receiver circuit of claim 2, wherein:
    which of the fifth and sixth AoA angles matches one of the first and second AoAs is determined based on which of the fifth and sixth AoA angles is closer to one of the first and second AoAs than the other of the first and second AoAs and is closer to the one of the first and second AoAs than the other of the fifth and sixth AoA angles is to either of the first and second AoAs.

6. The receiver circuit of claim 1, wherein the angular difference is 90°.

7. The receiver circuit of claim 1, wherein:
    the first RF signal is the same RF signal as the second RF signal;
    first RF signal is received at the first receiver antenna array in a first time slot and
    the second RF signal is received at the second receiver antenna array in a second timeslot.

8. The receiver circuit of claim 1, wherein the first receiver antenna array comprises a first receiver antenna and a second receiver antenna, and the second receiver antenna array comprises the first receiver antenna and a third receiver antenna.

9. The receiver circuit of claim 1, wherein the controller is further configured to:
calculate first and second angles of departure (AoDs) based on one or more digitized samples of a third RF signal received from a first transmit antenna array, and calculating third and fourth AoDs based on one or more digitized samples of a fourth RF signal received from a second transmit antenna array; and
determine which of the first and second AoDs is correct based on the third and fourth AoDs.

10. The receiver circuit of claim 9, wherein:
the first transmit antenna array is oriented at a first transmitter orientation angle;
the second transmit antenna array is oriented at a second transmitter orientation angle, such that there is a second angular difference between the first transmitter orientation angle and the second transmitter orientation angle; and
the controller is configured to determine which of the first and second AoDs is correct further based on the second angular difference.

11. The receiver circuit of claim 10, wherein:
the controller is further configured to subtract the second angular difference from each of the third and fourth AoDs to generate fifth and sixth AoD angles; and
the controller is configured to determine which of the first and second AoDs is correct based on at least one of:
identifying which of the fifth and sixth AoD angles is equal to one of the first and second AoDs to determine the correct AoD;
identifying which of the fifth and sixth AoD angles is less than a threshold angle different from one of the first and second AoDs to determine the correct AoD; or identifying which of the fifth and sixth AoD angles is closer to one of the first and second AoDs than the other of the first and second AoDs and is closer to the one of the first and second AoDs than the other of the fifth and sixth AoD angles is to either of the first and second AoDs.

12. A method of using a receiver circuit, the method comprising:
with at least a first receiver antenna array oriented at a first receiver orientation angle and a second receiver antenna array oriented at a second receiver orientation angle offset from the first receiver orientation angle by a non-zero angular difference, each of the first and second receiver antenna arrays being a linear array, receiving a plurality of RF signals transmitted from a transmitter circuit comprising one or more transmit antennas; and
with a controller of the receiver circuit:
calculating first and second angles of arrival (AoAs) based on one or more digitized samples of a first RF signal received at the first receiver antenna array, and calculating third and fourth AoAs based on one or more digitized samples of a second RF signal received at the second receiver antenna array, the first and second AoAs being mirrored over the first receiver orientation angle, the third and fourth AoAs being mirrored over the second receiver orientation angle; and
determining which of the first and second AoAs is correct based on at least one of the third AoA or the fourth AOAs and on the angular difference.

13. The method of claim 12, further comprising:
with the controller, subtracting the angular difference from each of the third and fourth AoAs to generate fifth and sixth AoA angles,
wherein the determining which of the first and second AoAs is correct comprises identifying which of the fifth and sixth AoA angles matches one of the first and second AoAs to determine the correct AoA.

14. The method of claim 13, wherein:
which of the fifth and sixth AoA angles matches one of the first and second AoAs is determined based on which of the fifth and sixth AoA angles is equal to one of the first and second AoAs.

15. The method of claim 13, wherein:
which of the fifth and sixth AoA angles matches one of the first and second AoAs is determined based on which of the fifth and sixth AoA angles is less than a threshold angle different from one of the first and second AoAs.

16. The method of claim 13, wherein:
which of the fifth and sixth AoA angles matches one of the first and second AoAs is determined based on which of the fifth and sixth AoA angles is closer to one of the first and second AoAs than the other of the first and second AoAs and is closer to the one of the first and second AoAs than the other of the fifth and sixth AoA angles is to either of the first and second AoAs.

17. The method of claim 12, wherein:
the angular difference is 90°.

18. The method of claim 12, wherein:
the first RF signal is the same RF signal as the second RF signal;
first RF signal is received at the first receiver antenna array in a first time slot; and
the second RF signal is received at the second receiver antenna array in a second timeslot.

19. The method of claim 12, further comprising, with the controller of the receiver circuit:
calculating first and second angles of departure (AoDs) based on one or more digitized samples of a third RF signal received from a first transmit antenna array, and calculating third and fourth AoDs based on one or more digitized samples of a fourth RF signal received from a second transmit antenna array; and
determining which of the first and second AoDs is correct based on the third and fourth AoDs.

20. The method of claim 19, wherein:
the first transmit antenna array is oriented at a first transmitter orientation angle;
the second transmit antenna array is oriented at a second transmitter orientation angle, such that there is a second angular difference between the first transmitter orientation angle and the second transmitter orientation angle; and
the determining which of the first and second AoDs is correct is further based on the second angular difference.

* * * * *